United States Patent [19]
Shivashankar et al.

[11] Patent Number: 6,139,831
[45] Date of Patent: Oct. 31, 2000

[54] APPARATUS AND METHOD FOR IMMOBILIZING MOLECULES ONTO A SUBSTRATE

[75] Inventors: Ganaganor Visweswara Shivashankar; Albert J. Libchaber, both of New York, N.Y.

[73] Assignee: The Rockefeller University, New York, N.Y.

[21] Appl. No.: 09/086,192

[22] Filed: May 28, 1998

[51] Int. Cl.[7] .............................. G01T 1/20; C09K 3/00; G01B 11/16; G01N 1/00; G01N 1/10

[52] U.S. Cl. ................. 424/82.05; 204/478; 205/352; 250/365; 252/302; 356/32; 356/36; 356/246; 356/317; 427/353; 427/357; 427/552; 430/38; 435/6; 438/63; 438/83; 438/463; 438/795; 424/82.05

[58] Field of Search ........................... 205/352; 204/478; 250/365; 252/302; 356/32, 36, 246, 317; 427/353, 551, 552; 430/38; 435/6; 438/63, 83, 463, 795

[56] References Cited

U.S. PATENT DOCUMENTS

| | | | |
|---|---|---|---|
| 4,979,821 | 12/1990 | Schutt et al. | 356/246 |
| 4,985,321 | 1/1991 | Chou et al. | 430/38 |
| 5,843,657 | 12/1998 | Liotta et al. | 435/6 |
| 5,859,699 | 1/1999 | Baer et al. | 356/240 |
| 5,922,543 | 7/1999 | Cremer | 435/6 |

FOREIGN PATENT DOCUMENTS 4904259 2/1990 Italy ........................... 623/16

OTHER PUBLICATIONS

Ashkin et al, 1995, Opt Lett, 11:288–90.
Berggren et al, 1995, Science, 269:1255.
Burke et al, 1997, Gen Res, 7:189–97.
Binning et al, 1986, Phys Rev Lett, 56:930–3.
Chetverin et al, 1994, Bio/Technology, 12:1093–9.
Delamarche et al, 1997, Science, 276:779–81.
Dulcey et al, 1991, Science, 252:551.
Ferguson et al, 1996, Nature Biotechnol, 14:1681–4.
Fodor et al, 1991, Science, 251:767.
Goffeau, 1997, Nature, 385–202–3.
Groves et al, 1997, Science, 275:651.
Guo et al, 1994, Nuc Acids Res, 22:5456–65.
Healey et al, 1995, Science, 269:1078.
Jackman et al, 1995, Science, 269:664–6.
Lockhart et al, 1996, Nature Biotechnology, 14:1675–80.
Marshall et al, 1998, Nature Biotechnology, 16:27–31.
Prime et al, 1991, Science, 252:1164.
Ramsay, 1998, Nature Biotechnology, 16:40–4.
Sapolsky et al, 1996, Genomics, 33:445–56.
Schena et al, 1995, Science, 270:467–70.
Schena et al, 1996, Proc Natl Acad Sci USA, 93:10614–9.
Schena et al, 1996, BioEssays, 18:427–31.
Southern, 1996, Trends in Genetics, 12:110.
Shivashankar et al. 1997, Appl Phys Lett, 71:22.

*Primary Examiner*—James C. Housel
*Assistant Examiner*—Ja-Na A. Hines
*Attorney, Agent, or Firm*—Klauber & Jackson

[57] ABSTRACT

Apparatus and method for immobilizing molecules, particularly biomolecules such as DNA, RNA, proteins, lipids, carbohydrates, or hormones onto a substrate such as glass or silica; patterns of immobilization can be made resulting in addressable, discrete arrays of molecules on a substrate, having applications in bioelectronics, DNA hybridization assays, drug assays, etc.

41 Claims, 8 Drawing Sheets lithography detection

APPARATUS AND METHOD FOR IMMOBILIZING MOLECULES ONTO A SUBSTRATE

GOVERNMENTAL SUPPORT

The research leading to the present invention was supported, at least in part, by a grant from the National Science foundation under Grant No. Phy-9408905. The Government may have certain rights in the invention.

FIELD OF THE INVENTION

The present invention relates to an apparatus and method for immobilizing a molecule, particularly a biomolecule such as DNA, RNA, or a protein, onto a substrate. Such a substrate has applications in bio-molecular networks, bio-chip microfabrication, bioelectronic circuitry, and rational drug design procedures.

BACKGROUND OF THE INVENTION

In many presently used bioassays, a molecule, such as DNA or a protein, is immobilized onto a substrate. For example, Western blots immobilize a protein onto a substrate, such as PVDF or nitrocellulose membrane, which is then probed with a ligand to the protein, such as an antibody, to determine whether the protein is present in a sample. Furthermore, Southern and Northern blots utilize a similar process, wherein DNA and RNA respectively are immobilized onto a nitrocellulose substrate, and probed with nucleic acid molecules having a complementary sequence to the desired DNA or RNA. In yet another example, an enzyme-linked immunosorbent assay (ELISA) involves immobilizing an antibody onto a substrate, and then exposing the immobilized antibody to a sample which is suspected of containing the antigen. If the antigen is present, it will bind to the immobilized antibody, and that binding can subsequently be detected. The methods described above employ primarily hydrophobic interactions between the molecule and substrate to immobilize the molecule. Hence, successful use of these techniques is dependent upon the chemical properties of the substrate.

Although these methods are widely used and accepted, they contain inherent limitations which can be detrimental to the productivity of researchers. For example, immobilizing a molecule onto a substrate is a very time consuming process. Initially, the molecules must electrophoresed using SDS-PAGE or agarose gel electrophoresis, which involves pouring the gel (and in the case of SDS-PAGE, exposing the researcher to toxic bis-acrylamide), installing the gel into a cassette, preparing numerous buffers, preparing the samples for electrophoresis, loading the samples onto the gel, and then electrophoresing the samples.

Immediately after the sample has been electrophoresed and molecules of the sample separated by size, the molecules must be transferred to a substrate, and immobilized onto the substrate. This immobilization involves the preparation of numerous buffers, careful handling of the substrate and gel, and carefully contacting the substrate to the gel in the presence of a buffer to avoid the entrapment of air bubbles between the gel and the substrate. A force, such as an electric current is then used to transfer molecules from the gel to the substrate.

More recently, efforts have been made to produce chips upon which molecules such as proteins or DNA are immobilized in predetermined arrays. Patterning such molecules on semiconductor substrates, coupled with specific recognition, are essential for the realization of bio-molecular networks. Furthermore, addressable arrays of DNA [Fodor, S. P. A., Read, J. L., Pirrung, M. C., Stryer, L., Lu, A. T., and Solas, D. *Science* 251:767 (1991); and Southern, E. M. *Trends in Genetics* 12:110 (1996) both of which are hereby incorporated by reference in their entireties] or proteins immobilized on a substrate can be used to provide tools for information retrieval, hybridization of DNA and binding affinity for molecules such as proteins, antibodies, lipids or carbohydrates in quick and reliable manner.

One method of producing such chips borrows substantially from photolithographic microfabrication techniques developed and optimized by the computer microprocessor industry, which permit the economic production of large batches of chips using photographic templates. More specifically, current lithographic approaches for immobilizing molecules, particularly biomolecules onto a substrate, use chemical methods to specifically treat substrates with photoresist and then using photomasking, a light beam or an electron beam to define the pattern of immobilization of the molecule on the substrate. Examples of the use of this technique include microlithography on self-assembled monolayers and lipids, microcontact printing, microfluid networks and light directed combinatorial synthesis [Prime, K. L., and Whitesides, G. M. *Science* 252:1164 (1991); Dulcey, C. S. et al., *Science* 252:551 (1991); Berggren, K. K., et al., *Science* 269:1255 (1995); Jackman, R. J.,et al., *Science* 269:664 (1995); Healey, B. G., et al., *Science* 269:1078 (1995); Delamarche, E., et al., *Science* 276:779 (1997); Groves, J. T., et al., *Science* 275:651 (1997); and Burke, D. T., et al., *Genome Research* 7:189 (1997), all of which are hereby incorporated by reference in their entireties].

However, all of the above mentioned approaches contain inherent limitations in that they all depend either on photolithographic techniques or substrate chemistry. For example, a proper control of the substrates enables the sequential synthesis of oligonucleotides [Fodor, 1991].

Hence, what is needed is an apparatus for immobilizing molecules, such as biomolecules, onto a substrate which permits patterning of the immobilization of molecules in adressable arrays, so that the substrates produced with the apparatus have ready applications in the production of bio-molecular networks, and to provide tools for information retrieval, hybridization of DNA and binding affinity of ligands for molecules, such as proteins, DNA, RNA, lipids, or carbohydrates immobilized on the substrate.

What is also needed is a method of immobilizing a molecule onto a substrate reliably and economically, and is not dependent upon the chemistry of the substrate.

The citation of any reference herein should not be construed as an admission that such reference is available as "Prior Art" to the instant application.

SUMMARY OF THE INVENTION

There are provided, in accordance with the present invention, an apparatus and method for immobilizing a molecule onto a substrate that are simpler and more cost effective than methods cited above, are independent of substrate chemistry, have biological specificity at the micron scale, and can lead to miniaturization and integration with electronic components.

Broadly, the present invention extends to an apparatus for immobilizing a molecule onto a substrate, comprising means for directing a beam of electromagnetic radiation at a substrate, wherein the substrate comprises a first surface and a second surface and a film of a material deposited onto the second surface, wherein the film absorbs electromagnetic radiation and is a poor conductor of heat. Furthermore, the apparatus comprises a chamber for holding a colloidal dispersion comprising insoluble particles coated with the molecule, such that the colloidal dispersion is in contact with the film, so that the beam can impinge the first surface, traverse the substrate, impinge an area of the film and ablate and melt the film at the area so that a gas bubble is formed in the colloidal dispersion above the area. The gas bubble can then disappear upon displacement of the beam from the area, and the particles of the colloidal dispersion can adhere to the film at the area. As a result, the molecule is immobilized onto the substrate.

In a further embodiment, the present invention extends to a method for immobilizing a molecule onto a substrate, comprising the steps of:

a) providing a substrate having a first surface and a second surface, and a film of a material deposited onto the second surface, wherein the material absorbs electromagnetic radiation and is a poor conductor of heat;

b) contacting the film with a colloidal dispersion comprising insoluble particles coated with the molecule;

c) directing a beam of electromagnetic radiation towards the substrate, such that the beam impinges the first surface, traverses the substrate, impinges an area of the film and ablates and melts the film in the area, forming a gas bubble in the colloidal dispersion above the area; and d) displacing the beam so that the gas bubble disappears and particles adhere to the film at the area, whereby the molecule is immobilized onto the substrate.

The present invention further extends to an apparatus or method for immobilizing a molecule onto a substrate, as described above, wherein the substrate comprises glass or silica. Also, the film deposited onto the second surface of the substrate can have any thickness. Preferably, the film has a thickness of approximately 50 Å.

The film can be comprised of any material that absorbs electromagnetic energy, is a poor conductor of heat, and has a low melting temperature, i.e. less than 1600 K. Examples of such materials having applications in the present invention include, but are not limited to gold or aluminum.

Moreover, in an apparatus or method for immobilizing a molecule onto a substrate, as described above, the colloidal dispersion comprises an aqueous solution, such as an aqueous solution of 50 mM NaCl, 0.02% Tween (polyoxyethylensorbitan, including fatty acid esters thereof), 2 mM $NaN_3$, pH=7.4. However, numerous other aqueous solutions well known to those of ordinary skill in the art have applications in the present invention. In addition, insoluble particles of the colloidal dispersion may be made of polystyrene, gold, or glass. The size of the insoluble particles can range from approximately 2 nm to approximately 100 nm. Preferably, the insoluble particles have a size smaller than the area of the film upon which the beam impinges. More particularly, the insoluble particles comprise polystyrene particles having a size of about approximately 40 nm.

Furthermore, the present invention extends to an apparatus or method for immobilizing a molecule onto a substrate, as set forth above, wherein the concentration of insoluble particles in the colloidal dispersion is approximately $10^{11}$ particles/$\mu l$.

The present invention further extends to an apparatus or method for immobilizing a molecule onto a substrate, wherein the beam of electromagnetic radiation has a wavelength in the near infrared region of the electromagnetic spectrum. Examples of applicable wavelengths for the beam that have applications in the present invention include, but are not limited to 830 nm or 1064 nm. In a preferred embodiment, the beam is a laser beam comprising a wavelength of 830 nm, an incident power of approximately 35 mW, a maximum power of approximately 150 mW, and a circular cross sectional area with a diameter of approximately 1 $\mu$m.

Moreover, the present invention extends to an apparatus for immobilizing a molecule onto a substrate, as described above, wherein the directing means comprises a microscopic objective lens immersed in oil. Preferably, the lens has a magnification of 100X, and a focal point on the film. In this way, the beam is altered to preferably have a circular cross sectional area with a diameter of approximately 1 $\mu$m, and substantially all the energy of the beam is delivered to the film.

Similarly, the present invention extends to a method for immobilizing a molecule onto a substrate, as described above, wherein the directing step comprises propagating the beam through a microscopic objective lens immersed in oil, wherein the lens has a magnification of 100X, 1.3 numerical aperture (NA), and a focal point on the film.

In another embodiment, the present invention extends to an apparatus for immobilizing a molecule onto a substrate, as described above, wherein the means for directing a beam of electromagnetic radiation at a substrate further comprising a means for steering the beam to permit movement of impingement of the beam on the film. As a result, patterns of immobilization of the molecule onto the substrate can be made. An example of a steering means of the present invention involves the use of two telescopic lenses each with a focal length of 100 mm. These lenses are positioned such that the beam passes through both lenses, and can be moved in three dimensions (X,Y, and Z). As a result, the area of the film upon which the beam impinges can be controllably changed, permitting the creation of patterns of immobilization of the molecule onto the substrate. The velocity of movement of the impingement of the beam on the film can vary, and is dependent upon the application and the amount of molecule one wishes to immobilize in a particular area of the film. More particularly, the slower the beam is steered, the longer it is permitted to impinge on a particular area of the film, and the greater the amount of molecule immobilized to that particular area of film. Preferably, the velocity of the movement of impingement of the beam with the film ranges from approximately 5 $\mu$m/second to approximately 50 $\mu$m/second.

Naturally, the present invention extends to a method for immobilizing a molecule onto a substrate, as described above, wherein the directing step further comprises steering the beam to permit movement of impingement of the beam on the film. As a result, patterns of immobilization of the molecule onto the substrate can be made. An example of steering the beam pursuant to the present invention involves propagating the beam through two telescopic lenses each with a focal length of 100 mm. These lenses are positioned such that the beam passes through both lenses, and the impingement of the beam onto the film can be moved in X and Y directions. As a result, the area of the film upon which the beam impinges can be controllably changed, permitting the creation of patterns of immobilization of the molecule on the substrate. Furthermore, the velocity of movement of the impingement of the beam on the film can vary, and is dependent upon the application and the amount of molecule one wishes to immobilize in a particular area of the film. More particularly, the slower the beam is steered, the longer it is permitted to impinge on a particular area of the film, and the greater the amount of molecule immobilized to that particular area of film. Preferably, the velocity of the movement of impingement of the beam with the film ranges from approximately 5 µm/second to approximately 50 µm/second.

The present invention further extends to an apparatus for immobilizing a molecule onto a substrate, as set forth herein, further comprising a means of generating the beam of electromagnetic energy. As explained infra, the beam can have any wavelength, provided the film absorbs the energy of the beam at the area of the film upon which the beam impinges, has a low melting temperature, i.e., less than 1600 K, and is a poor conductor of heat, i.e., heat generated in the area of impingement of the beam onto the film remains localized at the area of impingement. On example of a means for generating a beam which has applications in the present invention is a laser. For example, should a laser beam having a wavelength of 1064 nm be desired, an Nd YAG laser, which is commercially available, can be used in the present invention. In a preferred embodiment, the laser is a laser diode producing a beam having a wavelength of 830 nm.

Likewise, the present invention extends to a method for immobilizing a molecule onto a substrate, further comprising the step of generating the beam of electromagnetic energy prior to the step of directing the beam to the substrate. Pursuant to the present invention, the beam can have any wavelength, provided the film absorbs the energy of the beam at the area of the film upon which the beam impinges, and has a low melting point, and is a poor conductor of heat. As a result, the heat generated in the film remains localized at the area of impingement. Generating laser beams with various wavelengths is well known to one of ordinary skill in the art.

Furthermore, the present invention, as described herein, can be used to immobilize numerous types of molecules onto a substrate in adressable patterns. For example, biomolecules such as a nucleic acid molecule or fragments thereof, an isolated protein or fragments thereof, a lipid, or a carbohydrate, to name only a few, can be immobilized onto a substrate with the apparatus of the present invention. More specifically examples of nucleic acid molecules or fragments thereof which can be immobilized include, but are not limited to, DNA, RNA, or a combination of DNA and RNA. Furthermore, such nucleic acid molecules can be double stranded or single stranded. In addition, numerous examples of proteins, including antibodies, receptor proteins, DNA binding proteins, proteins having a protein binding domain, cytokines, lymphokines, or hormones, to name only a few, can be immobilized onto a substrate using the present invention.

In another embodiment, the present invention extends to an apparatus and method for immobilizing a molecule onto a substrate, wherein an individual insoluble particle of a colloidal dispersion, and coated with the molecule, is grafted onto the substrate. As a result, a particular pattern of immobilization of the molecule, or multiple molecules, can be made.

The present invention further extends to an apparatus for immobilizing a molecule onto a substrate, comprising:
  a) a chamber for holding a colloidal dispersion of insoluble particles coated with the molecule;
  b) means for supporting the substrate in the chamber; and
  c) means for selecting a particle of the colloidal dispersion and grafting the particle onto the substrate, such that the molecule is immobilized onto the substrate.

In addition, the present invention extends to a method of immobilizing a molecule onto a substrate, comprising the steps of:
  a) providing a chamber for holding a colloidal dispersion of insoluble particles coated with the molecule;
  b) supporting the substrate in the chamber; and
  c) selecting a particle of the colloidal dispersion;
  d) grafting the particle onto the substrate, such that the molecule is immobilized onto the substrate.

Hence, with such an apparatus and method of the present invention, a single particle coated with a particular molecule can be grafted to a substrate. As a result, patterns of immobilization of a molecule or multiple molecules can be created on the substrate.

Furthermore, the present invention extends to an apparatus or method for immobilizing a molecule onto a substrate in which a particle of a colloidal dispersion is grafted onto the substrate, wherein the substrate comprises a cantilever, and the particle is grafted to the cantilever. Examples of substrates having applications in the present invention include, but are not limited to silicon and silicon nitride.

In addition, a film comprising a material that may be deposited onto the substrate, wherein the material absorbs electromagnetic radiation, is a poor conductor of heat, and has a low melting temperature, i.e., less than 1600 K. Numerous materials have applications in the present invention as a film, including gold or aluminum, to name just a few. In a preferred embodiment, the film has a thickness of approximately 50 Å.

The present invention further extends to an apparatus or method for immobilizing a molecule onto a substrate in which a particle of a colloidal dispersion is grafted onto a substrate, as set forth above, wherein the colloidal dispersion comprises an aqueous solution. Numerous aqueous solutions can be used, particularly those that enhance the viability and activity of biomolecules. In a preferred embodiment, the aqueous solution comprises 0.1 M PBS. However, other solutions readily apparant to one of ordinary skill in the art also have applications in the present invention.

In addition, particles of a colloidal dispersion of the present invention coated with a molecule can be comprised of numerous materials, such as polystyrene, glass or gold, to name only a few. In a preferred embodiment, the particles are comprised of polystyrene and have a size of approximately 3 µm.

The present invention extends to an apparatus for immobilizing a molecule onto a substrate, comprising:
  a) a chamber for holding a colloidal dispersion of insoluble particles coated with the molecule;
  b) means for supporting the substrate in the chamber; and
  c) means for selecting a particle of the colloidal dispersion and grafting the particle onto the substrate, such that the molecule is immobilized onto the substrate, wherein the selecting and grafting means comprises an optical tweezers. An example of an optical tweezer having an application in the present invention is described in Ashkin, A., Dziedzic, J. M., Bjorkholm, J. E., and Chu, S., *Observation of a singlebeam gradient force optical trap for dielectric beads*. Opt.Lett. 11:288–290 (1986), which is hereby incorporated by reference in its entirety. Broadly, an optical tweezer comprises a laser beam having and a microscopic objective lens, such that the beam passes through the lens, and enters the chamber. In a preferred embodiment of the invention, the laser beam of the tweezer comprises a wavelength in the near infrared region of the electromagnetic spectrum, such as 830 nm, and is produced by a near infrared laser diode. Furthermore, the lens of an optical tweezer having applications in the present invention as a microscope objective lens with properties of 100 X, and 1.3 numerical aperture (NA).

Furthermore, the present invention extends to a method for immobilizing a molecule onto a substrate, comprising the steps of:

a) providing a chamber for holding a colloidal dispersion of insoluble particles coated with the molecule;

b) supporting the substrate in the chamber;

c) selecting a particle of the colloidal dispersion; and d) grafting the particle onto the substrate, such that the molecule is immobilized onto the substrate, in which the selecting and grafting steps are performed with an optical tweezer. An optical tweezer having applications in the invention has been described above.

Moreover, in an embodiment an apparatus of the present invention, the chamber for holding a colloidal dispersion of insoluble particles coated with the molecule to be immobilized is formed by a #1 coverglass with a polyvinyline o-ring glued onto the coverglass with paraffin, and the supporting means for supporting the substrate in the chamber comprises an XYZ stage adjacent to the chamber. This stage permits the movement of the substrate towards the selected particle in the optical tweezer. As a result, the beam of the optical tweezer impinges an area of the substrate, and particularly the cantilever of the substrate. The area of impingement is then heated, so that when the beam is displaced, the particle can adhere to the area, and the molecule is immobilized on the substrate.

Naturally, the present invention extends to a method for immobilizing a molecule onto a substrate, as set forth herein, wherein the step of providing chamber comprises providing a #1 coverglass with a polyvinyline o-ring glued onto the coverglass with paraffin, In addition, the supporting step of a method of the present invention involves providing an XYZ stage adjacent to the chamber, which permits the movement of the substrate towards the selected particle in the optical tweezer.

Accordingly, it is a principal object of the present invention to provide an apparatus and method for immobilizing a molecule, such as a biomolecule onto a substrate, which permits the formation of discrete, addressable patterns of immobilization of molecules on a substrate. These substrates can then be used in numerous applications, including in bio-molecular networks, bio-electronic circuitry, and in hybridization assays, protein assays, and drug design.

Another object of the present invention is to provide a simple, reliable, and inexpensive methods of immobilizing desired molecules onto a substrate, which requires very small quantities of molecules.

It is yet another object of the present invention to immobilize molecules, particularly biomolecules such as DNA, RNA, proteins, or carbohydrates, to name only a few, without modulating the activity of such molecules.

These and other aspects of the present invention will be better appreciated by reference to the following drawings and Detailed Description.

BRIEF DESCRIPTION OF THE DRAWINGS

FIG. 3. Schematical view of the steps in biospecific lithography and recognition.

FIG. 4. Schematical view of the DNA hybridization experiment.

FIG. 5

FIG. 6

DETAILED DESCRIPTION OF THE INVENTION

Figure 1:
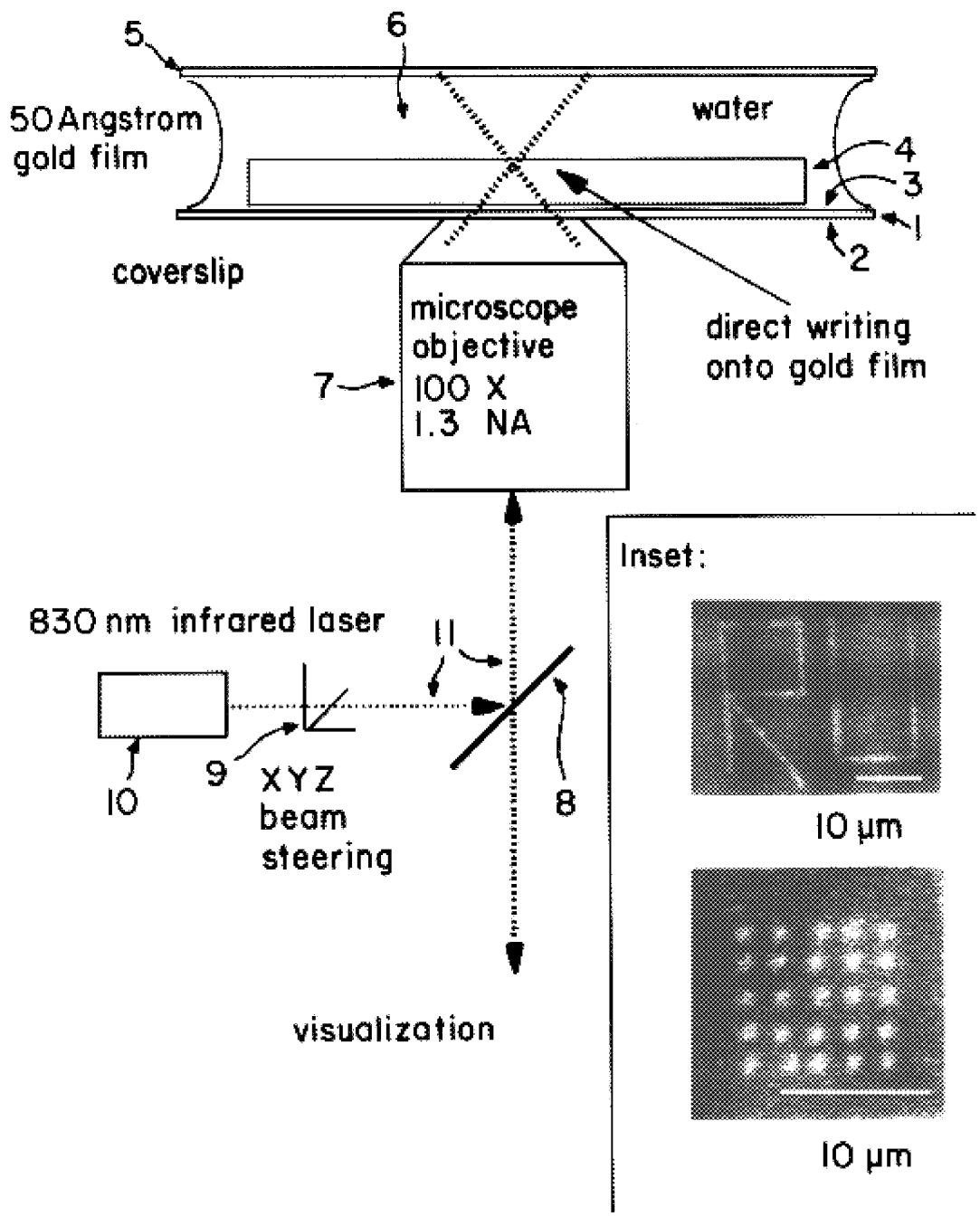
FIG. 1. Schematical view of an apparatus and method of the present invention. A laser beam is focused onto a gold-coated glass substrate. Laser absorption results in local melting and ablation of the gold film. Using a laser beam steering, based on a telescopic lens system, the focused spot is moved in the x-y plane to obtain any desired pattern. Inset a. Top: a line pattern RU (Rockefeller University). Line width less than 1 $\mu$m. The pattern is visualized using epi-illumination and a CCD camera. Bottom: array of spots with spacing of about 2 $\mu$m. In both cases the negative of the images are presented for better contrast.

The present invention is based upon Applicants' discovery that unexpectedly, a substrate in contact with a colloidal dispersion comprising insoluble particles coated with a molecule can be impinged with laser beam to form patterns of melting and ablation on the substrate to which the insoluble particles can adhere without effecting the activity of the molecule, particularly biomolecules. As a result, the molecule is immobilized onto the surface of the substrate, and available for further use in numerous assays, and bio-electronic applications.

The present invention is further based upon Applicants' discovery that unexpectedly, individual particles coated with a molecule can be attached to a substrate at a specific predetermined location.

Hence, broadly the present invention extends to an apparatus for immobilizing a molecule onto a substrate, comprising means for directing a beam of electromagnetic radiation at a substrate, wherein the substrate comprises a first surface and a second surface and a film of a material deposited onto the second surface, wherein the film absorbs electromagnetic radiation and is a poor conductor of heat. Furthermore, the apparatus comprises a chamber for holding a colloidal dispersion comprising insoluble particles coated with the molecule, such that the colloidal dispersion is in contact with the film, so that the beam can impinge the first surface, traverse the substrate, impinge an area of the film and ablate and melt the film at the area so that a gas bubble is formed in the colloidal dispersion above the area. The gas bubble can then disappear upon displacement of the beam from the area, and the particles of the colloidal dispersion can adhere to the film at the area. As a result, the molecule is immobilized onto the substrate.

The present invention further extends to a method for immobilizing a molecule onto a substrate, comprising the steps of:

a) providing a substrate having a first surface and a second surface, and a film of a material deposited onto the second surface, wherein the material absorbs electromagnetic radiation and is a poor conductor of heat;

b) contacting the film with a colloidal dispersion comprising insoluble particles coated with the molecule;

c) directing a beam of electromagnetic radiation towards the substrate, such that the beam impinges the first surface, traverses the substrate, impinges an area of the film and ablates and melts the film in the area, forming a gas bubble in the colloidal dispersion above the area; and d) displacing the beam so that the gas bubble disappears and particles adhere to the film at the area, whereby the molecule is immobilized onto the substrate.

For purposes of the present invention, a material which is a "poor conductor of heat" is a material which, upon impingement with a laser beam, absorbs the energy of the beam at the area of impingement, and heated generated at the area is not substantially conducted away therefrom to other parts of the material. As a result, absorbtion of the energy of the beam results in local melting and ablation of the film at the area of impingement.

Furthermore, for purposes of the present invention, a material having a "low melting" temperature refers to a material having a melting point less than or equal to 1600 K. Examples of such materials include, but are not limited to, gold or aluminum.

Referring to FIG. 1, substrate (1) has a first surface (2) and a second surface (3). Examples of materials which can serve as a substrate include, but are not limited to glass or silica. In a preferred embodiment, the substrate is comprised of silica having a width of approximately 100 μm. In addition, film (4) is deposited onto surface (3) of substrate (1). It is preferred that film (4) be a material that absorbs electromagnetic energy, particularly energy in the near infrared region of the electromagnetic spectrum, is a poor conductor of heat, and has a low temperature melting point, i.e. less than 1600 K. Examples of materials having applications as film (4) in the present invention include gold or aluminum to name only a few. In a preferred embodiment, film (4) is gold having a thickness of approximately 50 Å. Methods of depositing film (4) onto surface (3) of substrate (1) are readily known to the skilled artisan, and include vapor deposition, plasma enhanced vapor deposition, chemical deposition, or sputtering, to name only a few.

Referring again to FIG. 1, a chamber (5) is provided for holding a colloidal dispersion (6) in contact with film (4) deposited onto surface (3) of substrate (1). Preferably, colloidal dispersion (6) comprises insoluble particles coated with the molecule to be immobilized onto the substrate, and an aqueous solution. Numerous particles have applications in the present invention, and are readily apparent to the skilled artisan. For example, the particles may be comprised of a material such as polystyrene, gold, or glass to name only a few. Furthermore, numerous types of molecules, such as biomolecules can be coated onto insoluble particles. Examples of biomolecules which can be coated onto insoluble particles in colloidal dispersion (6) include, but are not limited to single or double stranded nucleic acid molecules, such as DNA, RNA, or a combination of DNA and RNA, proteins, such as antibodies, receptors, DNA binding proteins, cytokines or lymphokines, or proteins having a domain which binds to other proteins, hormones, carbohydrates, and lipids. Since methods of coating particles with a molecule, particularly a biomolecule such as DNA, are readily known to one of ordinary skill in the art, they will not be explained in detail here.

The size of the insoluble particles may vary, and is dependent upon the particular application. For example, their size may range from approximately 2 nm to approximately 100 nm. It is preferred the insoluble particles of colloidal dispersion (6) have a sizes less than that of the area of film (4) upon which laser beam (11) impinges. This impingement will be explained below. In a specific embodiment of the present invention, the insoluble particles are comprised of polystyrene and have a size of approximately 40 nm. Furthermore, the concentration of coated insoluble particles in colloidal dispersion (6) can vary depending upon the application. In an embodiment of the invention, the concentration of particles in colloidal dispersion (6) is approximately $10^{11}$ particles/µl of dispersion.

Moreover, numerous aqueous solutions have applications in colloidal dispersion (6) held in chamber (5). If the molecule to be immobilized is a biomolecule, such as DNA, RNA, or a protein, to name only a few, it is preferred the aqueous solution be comprised of compositions that preserve the activity of the molecule, such as phosphate buffered saline (PBS). An example aqueous solution of colloidal dispersion (6) held in chamber (4) comprises 50 mM PBS, 50 mM NaCl, 0.02% (v/v) Tween, 2 mM $NaN_3$, pH 7.4. Another example having applications in the present invention is 0.1 M PBS (phosphate buffered saline). Other solutions that maintain the viability and activity of biomolecules readily apparent to the skilled artisan also have applications in the present invention.

In addition, as explained above, an apparatus of the present invention provides a means for directing a beam (11) of electromagnetic radiation towards substrate (1), such that the beam impinges surface (2) of substrate (1), traverses substrate (1), impinges an area of film (4) and ablates and melts film (4) in the area. In an embodiment of the present invention, beam (11) is a laser beam having a wavelength in the near infrared region of the electromagnetic spectrum. Examples of wavelengths for beam (11) that have applications in the present invention include, but are not limited to 830 nm or 1064 nm. In a preferred embodiment of the present invention, beam (11) is a laser beam comprising a wavelength of 830 nm, an incident power of approximately 35 mW, and maximum power of approximately 150 mW. A means for directing beam (11) of the present invention includes microscopic objective lens (7). In order to increase the efficiency of the apparatus of the invention, lens (7) should have a focal point on film (4) so that substantially all the energy of beam (11) is delivered to the area of impingement on film (4). Furthermore, lens (7) may be immersed and oil, have a magnification of 100X, a 1.3 N.A., and a focal point on film (4). Optionally, a means for directing beam (11) towards substrate (1) may include mirror (8), should a skilled artisan desired to have beam (11) enter the apparatus of the present invention from an angle relative to the focal plane of lens (7).

Again referring to FIG. 1, an apparatus of the present invention may further include a beam steering means (9) which permits the movement of impingement of beam (11) on film (4). As a result, the skilled artisan can control the formation of patterns of immobilization of a molecule or molecules onto substrate (1). In an embodiment of the present invention, steering means (9) comprises two telescopic lenses, each with a focal length of 100 mm (lens not shown). The lenses are positioned such that beam (11) propagates through them prior to propagating through lens (7) and impinging an area of film (4). As a result, beam (11) can be controlled to impinge more than one area of film (4), permitting the creation of patterns of immobilization of a molecule onto substrate (1).

Moreover, the velocity at which beam (11) is moved, and hence, the velocity of the change of area of film (4) impinged by beam (11) can vary, depending upon the particular application. The lower the velocity of the movement of beam (11), the longer it is permitted to impinge a particular area of film (4), and the greater the amount of molecule immobilized on the particular area of film (4). The range of velocities of movement of beam (11) are approximately 5 µm/second to approximately 50 µm/second.

Furthermore, as set forth in FIG. 1, an apparatus of the present invention may optionally comprise a means (10) for generating beam (11), such as a laser. As explained above, it is preferred beam (11) have a wavelength in the near infrared region of the electromagnetic spectrum. Hence, means (10) having applications in the present invention include an Nd YAG laser diode, which emits a beam having a wavelength of 1064 nm, or a laser diode producing a beam having a wavelength of 830 nm. Preferably, means (10) is a laser diode which generates a beam having a wavelength of 830 nm.

In addition, as explained above, the present invention extends to a method for immobilizing a molecule onto a substrate, comprising the steps of:

a) providing a substrate having a first surface and a second surface, and a film of a material deposited onto the second surface, wherein the material absorbs electromagnetic radiation and is a poor conductor of heat;

b) contacting the film with a colloidal dispersion comprising insoluble particles coated with the molecule;

c) directing a beam of electromagnetic radiation towards the substrate, such that the beam impinges the first surface, traverses the substrate, impinges an area of the film and ablates and melts the film in the area, forming a gas bubble in the colloidal dispersion above the area; and d) displacing the beam so that the gas bubble disappears and particles adhere to the film at the area, whereby the molecule is immobilized onto the substrate.

Hence, pursuant to the method of the present invention, and referring to FIG. 1, substrate (1) having a first surface (2) and a second surface (3) upon which a film (4) is deposited is provided, a colloidal dispersion (6), having properties as described above, is provided and placed in contact with film (4) of substrate (1). Optionally, chamber (5) for holding colloidal dispersion (6) in contact with film (4) is provided. As described above, colloidal dispersion (6) comprises insoluble particles coated with the molecule to be immobilized onto the substrate, and an aqueous solution. A beam of electromagnetic radiation (11) is then directed at substrate (1) such that beam (11) impinges surface (2) of substrate (1), traverses substrate (1), and impinges an area of film (4). As a result the area of impingement of film (4) is ablated and melted. Furthermore, a bubble forms in colloidal dispersion (6) above the area. After beam (11) is displaced or moved such that it no longer impinges the area of film (4), the bubble disappears and particles of colloidal dispersion (6) adhere to the area of film (4). As a result, the molecule is immobilized to substrate (1). Additional details regarding the method of the invention are described below in Example I.

Figure 2A:
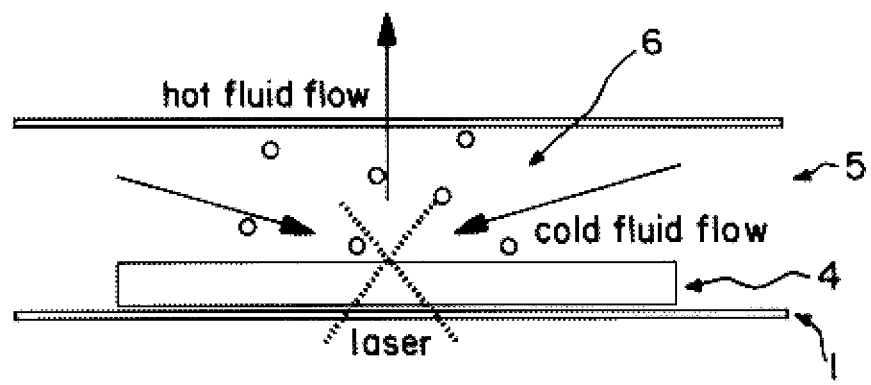
FIG. 2. Schematical view of probable particle motion in the colloidal dispersion. Although not intending to be bound by any particular theory, Applicants believe that due to convective flow, particles flow in the colloidal dispersion as set forth herein.
FIG. 2B. Schematical view of the particle aggregation on the laser ablated substrate.
FIG. 2C. Fluorescence visualization of the adsorbed pattern. Width of the line pattern depends on laser power, spot size, rate of inscription and the concentration of particles in suspension. On top a continuous line and a discontinuous one (laser blocked for a short time) are shown (5 $\mu$m/sec thick line, 10 $\mu$m/sec middle line, 20 $\mu$m/sec thin line, 35 mW power).

FIG. 2(a) is a schematical view of chamber (5) of the present invention. In particular, beam (11) (not shown) impinges an area of film (4) of substrate (1), such that film (4) is in contact with colloidal dispersion (6). As a result, the area of film (4) impinged by beam (11) (not shown) is ablated and melted, and a bubble forms in colloidal dispersion (6) which prevents insoluble particles (12) coated with the molecule to be immobilized from interacting with film (4). However, after beam (4) is moved or displaced, the bubble above the area of film (4) disappears, and particles (12) can adhere to the area of film (4). As a result, the molecule is immobilized onto substrate (1).

Figure 2B:
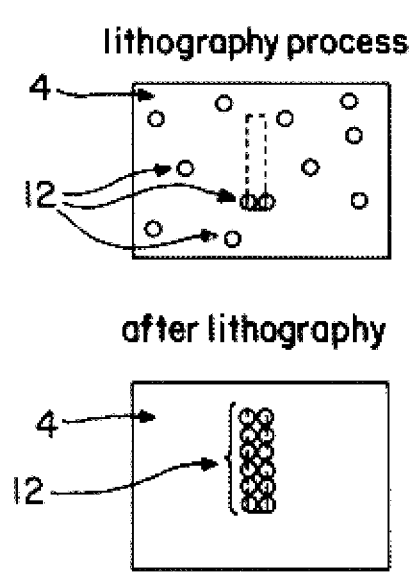

FIG. 2(B) is a schematical view of the adherence of particles (12) onto substrate (1). The area impingement of beam (11) (not shown) onto film (4) is schematically indicated with broken lines. After beam (11) (not shown) is displaced or moved, the bubble formed in colloidal dispersion (6) above the area disappears, and particles (12) can adhere to the area of impingement, as schematically shown in FIG. 2(B).

In another embodiment, the present invention extends to an apparatus for immobilizing a molecule onto a substrate, comprising:

a) a chamber for holding a colloidal dispersion of insoluble particles coated with the molecule;

b) means for supporting the substrate in the chamber; and c) means for selecting a particle of the colloidal dispersion and grafting the particle onto the substrate, such that the molecule is immobilized onto the substrate, wherein the selecting and grafting means comprises an optical tweezer.

An example of an optical tweezers having an application in the present invention is described in Ashkin, a., Dziedzic, J. M., Bjorkholm, J. E., and Chu, S., *Observation of a singlebeam gradient force optical trap for dielectric beads. Opt.Lett.* 11:288–290 (1986), which is hereby incorporated by reference in its entirety. Pursuant to FIG. 5, the optical tweezer comprises beam of electromagnetic radiation (22) and lens (18), such that the beam (22) propagates through the lens (18) and enters chamber (13). In an embodiment of the invention, beam (22) has a wavelength in the near infrared region of the electromagnetic spectrum, such as 830 nm, and is produced by near infrared laser diode (19). Furthermore, lens (18) is a microscope objective lens with properties of 100 X, and 1.3 N.A.

Again referring to FIG. 5, chamber (13) for holding colloidal dispersion (14) of insoluble particles coated with the molecule to be immobilized onto substrate (15) is formed by a #1 coverglass with a polyvinyline o-ring glued onto the coverglass with paraffin, and the supporting means for supporting substrate (15) in chamber (13) comprises an XYZ stage (17). Stage (17) permits the movement of substrate (15) in chamber (13) towards the selected particle in the optical tweezer. As a result, beam (22) impinges an area of substrate (15), and particularly a cantilever (16) of substrate (15). The area of impingement is then heated, so that when beam (22) is displaced, the optical tweezer can move the selected particle towards the area of impingement of substrate (15), permitting the particle to adhere to the area. As a result, the molecule is immobilized onto substrate (15), and particularly cantilever (16) of substrate (15).

Optionally, colloidal dispersion (14) can be stored in multiwell particle chamber (21), which is connected to sample chamber (13) and in fluid registry therewith via flow cell (24). Also optionally, the means for selecting and grafting the particle onto the substrate may include mirror (20), which permits beam (22) to be produced and enter the apparatus of the present invention at an angle to the focal plane of microscope objective (18). Furthermore, the present invention may optionally include a fluoresce excitation source (23) which follows the same path of beam (22) of the optical tweezer, and excites ligands labeled with a fluorescent chemical which bind to the molecule coating insoluble particle of colloidal dispersion (not shown) that has been grafted to substrate (15) using an apparatus and method of the present invention. Hence, the presence of the immobilized molecule on substrate (15) can be detected.

The present invention may be better understood by reference to the following non-limiting examples, which are provided as exemplary of the invention. The following examples are presented in order to more fully illustrate the preferred embodiments of the invention. They should in no way be construed, however, as limiting the broad scope of the invention.

EXAMPLE I

A new method for immobilizing and patterning biomolecules on a substrate, using localized laser absorption, and sub-micron lithography Direct beam bio-molecular patterning on gold-coated glass substrates, using diffraction limited near infrared laser spot, is used for DNA recognition and specific ligand-receptor interactions. Using a microscope objective lens, a near infrared laser beam is focused onto a glass slide coated with 50-Angstrom gold film. Localized laser absorption results in partial melting and ablation of gold at the area of impingement of the beam onto the film. Spatially moving the laser spot, a stable etched gold pattern is obtained at sub-micron resolution. During the process, sub-micron particles in a colloidal dispersion in contact with the film aggregate along the melted gold film. The sub-micron particles are themselves coated with specific biomolecules, like the protein avidin or single stranded DNA oligomers, for specific biomolecular recognition. Hence, the present invention can be used to create patterns of immobilization of biomolecules on a substrate. The physical essentials of the technique are straightforward and simple to realize. A near infrared laser, focused onto a diffraction-limited area of the film to locally heat a thin gold film deposited on the surface of a substrate. Ablation of the gold at the area of the film upon which the beam impinges leaves a permanent trace as the laser spot is translated. Concurrently, a convective flow is induced in the aqueous solution of the colloidal dispersion. Insoluble particles coated with the molecule to be immobilized onto the substrate in the colloidal dispersion are entrained by the flow and locally attracted by the laser, acting as an optical trap. The particles are protected from overheating by a minute gas bubble, which forms above the area of the film impinged by the laser beam. As the beam is displaced or moved, the bubble shrinks and the particles stick to the ablated area of the film. Hence, the molecule is immobilized onto the film.

If the particles of the colloidal dispersion are conjugated with biomolecules on their surface, a number of interesting possibilities present themselves. In particular, the present invention can be used to produce DNA oligonucleotides micro arrays for cDNA libraries. In addition, other biomolecules such as proteins (antibodies, cytokines, lymphokines, receptors, DNA binding proteins, proteins having domains which bind other proteins), hormones, lipids, or carbohydrates can easily be immobilized onto a substrate with the present invention. Different geometries, lines, points, arrays can be generated at will as well as writing. A wide range of particle size can be used, from 10 nm to a few $\mu$m, giving great versatility. The main attraction of the present invention is the easiness of its implementation for immobilization and patterning of biomolecules on a solid substrate. Two realizations are set forth herein. In the first one, a biotin-avidin complex is used as an example of receptor-ligand specificity. The second demonstrates the applicability to DNA recognition through hybridization.

FIG. 1 presents the physical components of an apparatus of the present invention. Glass substrates used in the experiment are prepared by sputtering thin gold films on the order of 50 Å. Numerous methods of depositing a film onto a substrate are well known to the skilled artisan. The method used herein to deposit the film of gold onto the substrate (#1 cleaned glass coverslips, 22 mm$^2$) involved standard sputtering (BAL-TEC MED 020) in argon atmosphere, with the target being kept at room temperature. Rate of depositions 5 Å/sec. The thickness, 50 Å, is measured in vitu using a quartz monitor.

A near infrared laser beam (maximum power 150 mW, 830 nm) is focused onto a diffraction limited spot on the gold film using a microscope objective lens (100X, 1.3 NA, oil immersion), which also serves for visualization purposes More specifically, a laser beam produced from a near infrared laser diode (SDL Inc.) is collimated to a circular beam of 1 $\mu$m diameter. Two telescopic lenses (100 mm focal length) are used for beam steering. To generate patterns smaller than 30 μm, beam steering is used. For larger patterns, the sample stage, on which the coverslip is mounted (not shown in FIG. 1), is translated.

The use of an aqueous solution in the present invention can be avoided, but it has been found that aqueous solutions help to avoid excess heating and enhances the contrast. It is also essential for the next step of particle decoration, or adherence to the substrate.

Thin granular films of gold absorb infrared radiation well, but conduct heat poorly. Improved thermal isolation is caused by the formation of a small gas bubble when the gold film is heated. The exposure time to the laser beam at a given spot is critical, since continuous heating for more than a few seconds results in the formation of large gas bubbles. Exposure times of about 0.2 seconds on a particular area of the film (for 35 mW incident power) ensure that the size of the bubble is on the order of the beam spot size (i.e., the size of the area of the film upon which the beam impinges).

The inset to FIG. 1 shows applications of the present invention. Drawing continuous lines produces writing with submicron thickness. An array of micron scale dots with micron scale separation is also shown. In an embodiment of the present invention, manual beam steering was used to move the area of impingement of the beam upon the film. However, automated XYZ translation and beam control can easily be implemented. The inscribed line width can vary from 500 nm to 10 μm and depends on the size of the area of the film upon which the beam impinges.

The introduction of the insoluble particles coated with the molecule to be immobilized, in the colloidal dispersion, leads to a number of effects, as described in FIG. 2. Local heating of the gold film induces a convective flow (FIG. 2A), entraining the particles of the colloidal dispersion toward the hot spot, where they are further attracted by the laser tweezing power. There, a gas bubble forms over the area of impingement and acts as a thermal shield so that the particles are never in contact with the very hot gold area. This reduces the damage to the eventual functionality of the biomolecules absorbed on the particles' surface. Finally, as the beam is displaced, the microbubble disappears and the particles wet the still warm gold surface, which is then below 100° C., and stick to it permanently. In all of this process the flow maintains the local concentration of particles, and thus no local depletion is caused by the adhesion. Approximately $6 \times 10^5$ particles are required to decorate a line 10 μm wide and 100 μm long. As $10^{11}$ particles/μl of colloidal dispersion (volume 10 μl) are used, concentration depletion at the etching front during lithography is negligible. During laser inscription a typical mean flow velocity at the focal plane is 20 μm/sec (micron-sized particles are used here in order to visualize).

40 nm size fluorescent particles (10 μl volume and $10^{11}$ particles/μl) made of polystyrene were used to decorate the ablated and melted area of the film. Numerous sizes of particles have been examined, and it has been determined that optimum results are obtained when the particles are smaller than the diffraction limited area of the film upon which the laser beam impinges. The control parameters of the lithographic process set forth herein are: laser power, spot size, particle size and concentration, rate of inscription. As a line was drawn by moving the sample stage (or beam steering), small z shift of the objective was not automatically corrected. As a result, there existed a slight inhomogeneity of particle deposition. To pattern biomolecules, a near infrared laser is suitable. At this wavelength there is minimal damage to the biomolecules. Furthermore, any substrate may work as long as there is localized heating and a colloidal dispersion.

Figure 2C:
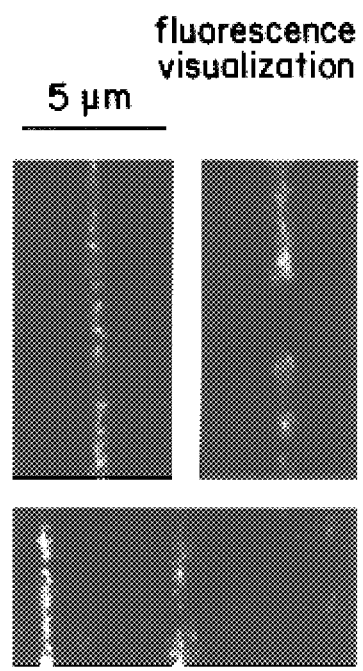

For inscription the laser scans at velocities ranging from 5 to 50 μm/sec. At the end of the inscription the sample cell is washed to remove free particles (FIG. 2B). As seen in FIG. 2C, the insoluble particles of the colloidal dispersion decorate the pattern, which can be visualized by fluorescence techniques, and their density depends on the velocity of the laser scan. Using high-resolution images, it has been found that the decorated lines are composed of micro-domains, with a mean diameter on the order of the laser spot.

The first example of an apparatus and method of this embodiment of the present invention utilizes 40 nm avidin coated (non-fluorescent) spheres. The presence of a layer of proteins does not alter the wetting and sticking properties of the particles (11). After drawing the pattern on the film, the coverslip is washed to remove free particles, and 40 nm biotin labeled (fluorescent) particles are then used to specifically recognize the avidin pattern. 16.40 nm avidin coated (non-fluorescent) particles and 40 nm biotin coated (fluorescent) particles (Molecular probes) were stored in 50 mM sodium phosphate buffer, 50 mM NaCl, 7.4 pH, 0.02% Tween (polyoxyethylenesorbitan, including fatty acid esters thereof), 2 mM sodium azide. The sample volume is 10 μl corresponding to $10^{12}$ particles.

Figure 3A:
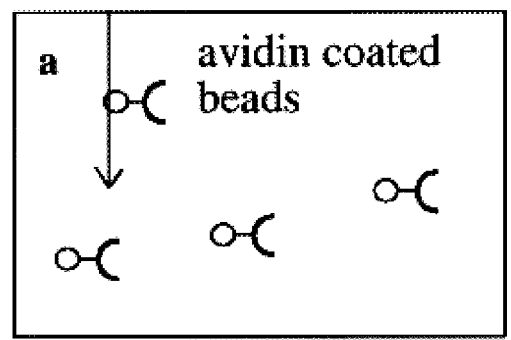
FIG. 3A is a schematical view of avidin coated particles suspended in a colloidal dispersion.
Figure 3B:
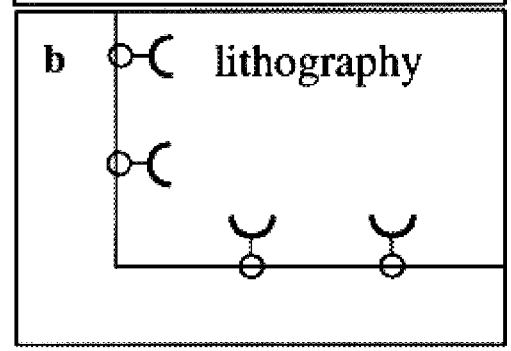
FIG. 3B is a schematical view of avidin coated particles adhering to the film of the substrate, such that avidin is immobilized onto the substrate in a pattern.
Figure 3C:
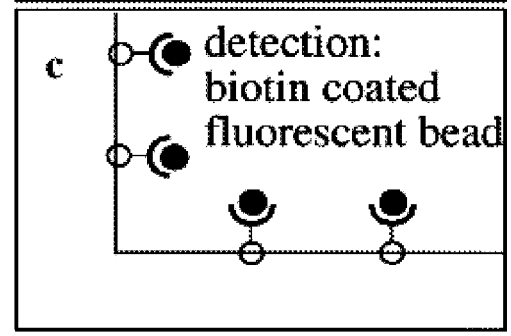
FIG. 3C is a schematical view of recognition by a second set of biotin coated fluorescent particles.
Figure 3D:
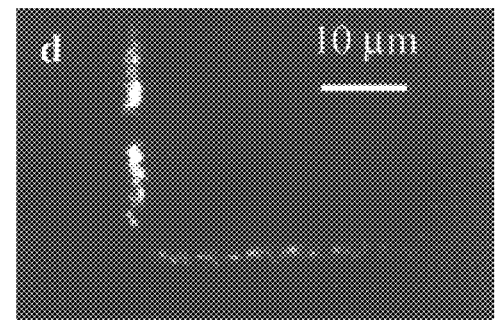
FIG. 3D is a fluorescence image after specific recognition of the biotin-avidin complex.
Figure 3E:
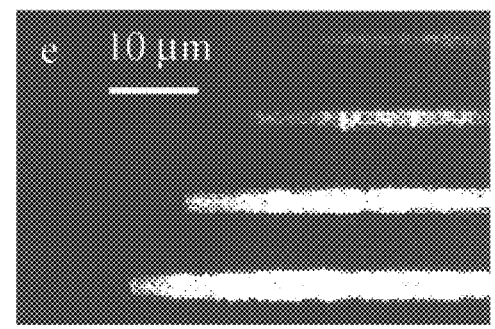
FIG. 3E shows fluorescence images after specific recognition of the biotin-avidin complex with varying line widths obtained by changing the focal height and therefore the size of the area of impingement of the beam on the film. (shown from top to bottom 1 $\mu$m, 3 $\mu$m, 5 $\mu$m, 7 $\mu$m, 60 mW power).

The avidin-biotin pair was chosen as a model of receptor-ligand biomolecular system. This process is schematically shown in FIGS. 3A–3C. FIG. 3D shows a typical result, while FIG. 3E shows the effect of varying the spot size and correspondingly varying the line width. The limitation on the separation between lines is defined by the spot size, and is on the order of a micron. Subsequent writing with a micron scale line separation does not alter the bio-specificity of the written lithographic patterns. As a control, after inscription and recognition, sample temperature was increased up to 65° C. and the dissociation of the biotin-avidin binding was observed, probably due to denaturation of avidin.

The second example set forth herein deals with the problem of recognition of a given sequence of single stranded DNA by hybridization to the complementary strand. Two different nucleic acid molecules, one molecule comprising a DNA sequence of GTATCACGAGGCCCT (SEQ ID NO:1) and the other molecule comprising a DNA sequence of GACAGCTTATCATCG (SEQ ID NO:2) were used to demonstrate the specificity of recognition. Particles covered with the nucleic acid molecule comprising a DNA sequence of SEQ ID NO:1 were initially deposited on even lines of an array of parallel lines using the apparatus and method of the present invention. The particle-oligo construct involved 10 μl of a stock of biotinylated oligomers (0.05 mg/ml in TE buffer) added to 10 μl of avidin coated particles ($10^{12}$ particles), which was then incubated at room temperature for 10 minutes. The construct is identical for SEQ ID NO:1 and SEQ ID NO:2.

Figure 4A:
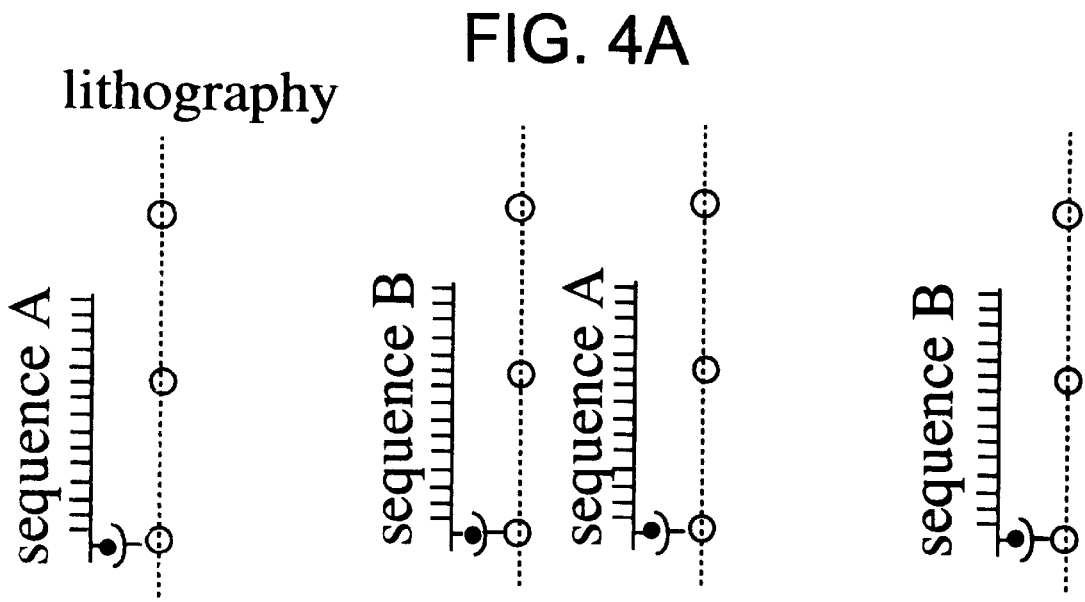
FIG. 4A is a schematical view of alternating patterns of molecules immobilized on a substrate, wherein the patterns are generated by two different single stranded oligomers attached to 40 nm particles.
Figure 4B:
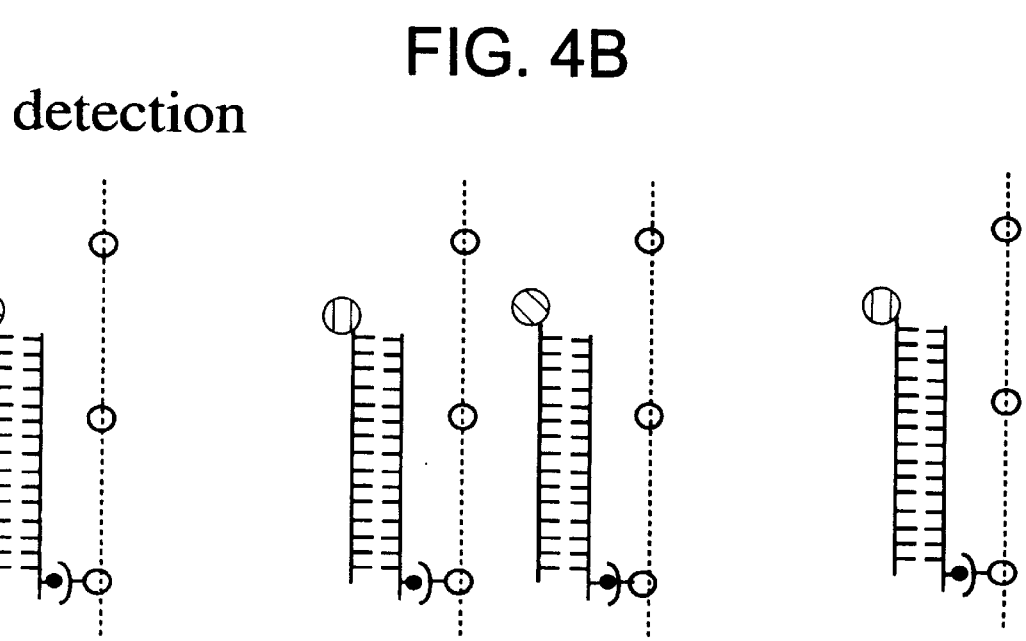
FIG. 4B is a schematical view of specific recognition in the detection step.
Figure 4C:
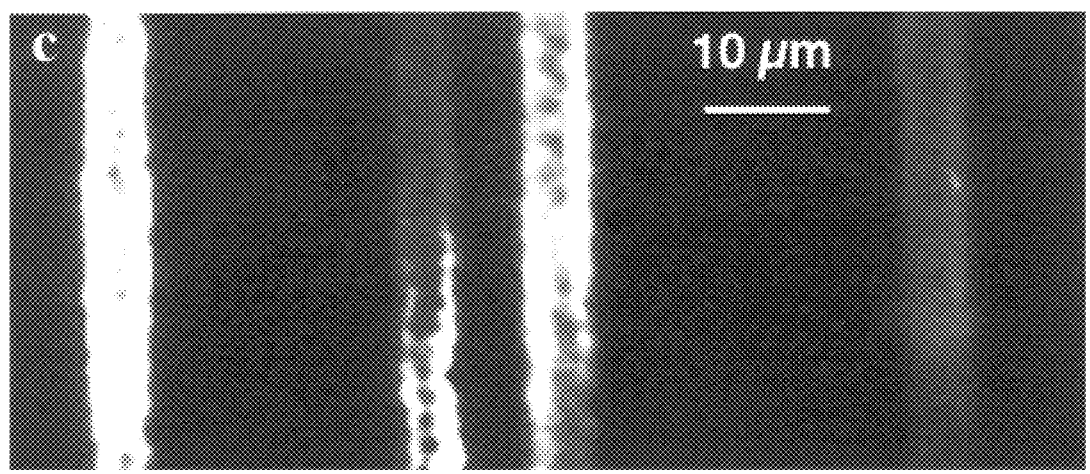
FIG. 4C is a fluorescence image detection of the immobilized DNA sequences by complementary single stranded DNA hybridization fluorescently labeled (succinimidyl ester of carboxyfluorrescein (FAM) for A and Rhodamine for B). Grayscale images are acquired with an intensifier. They are artificially colored to represent the two different fluorophores and then added.

After washing the sample, particles coated with the nucleic acid molecule comprising a DNA of SEQ ID NO:2 were deposited on the odd lines (FIG. 4A). To recognize the patterned single stranded DNA, DNA molecules complementary to SEQ ID NOS:1 and 2 were used. The complementary sequences were tagged by two different fluorophores at the 3' end, FAM for the DNA molecule complementary to SEQ ID NO:1, and Rhodamine for the DNA molecule complementary to SEQ ID NO:2. This is depicted in FIG. 4B. Adding equal amounts of the two complementary sequences to the sample well leads to specific recognition of the alternating inscribed DNA patterns. The resulting fluorescence microscopy picture is shown in FIG. 4C. The images are simultaneously acquired, in grayscale, using two different excitation filters to detect the hybridization of the two sequences.

Detection involved introducing nucleic acid molecules having DNA sequences complementary of both oligonucleotides (0.05 mg/ml in TE buffer 20 $\mu$l volume) into the sample cell. The hybridization reaction is carried out for approximately one hour at room temperature. After rinsing, detection is done using standard fluorescence microscopy and image intensifier (Hamamatsu). FAM is excited at 480 nm (fluorescein filter) and Rhodamine at 530 nm (Rhodamine filter).

The grayscale images are then independently colored to represent the two fluorophores and then added to show the sequence specificity of the etched patterns (FIG. 4C). Non-specific interactions lead to much weaker contrast. Differentiation is easily detected, even for 5 $\mu$m separation between two neighboring oligomer lines.

EXAMPLE II

Figure 5A:
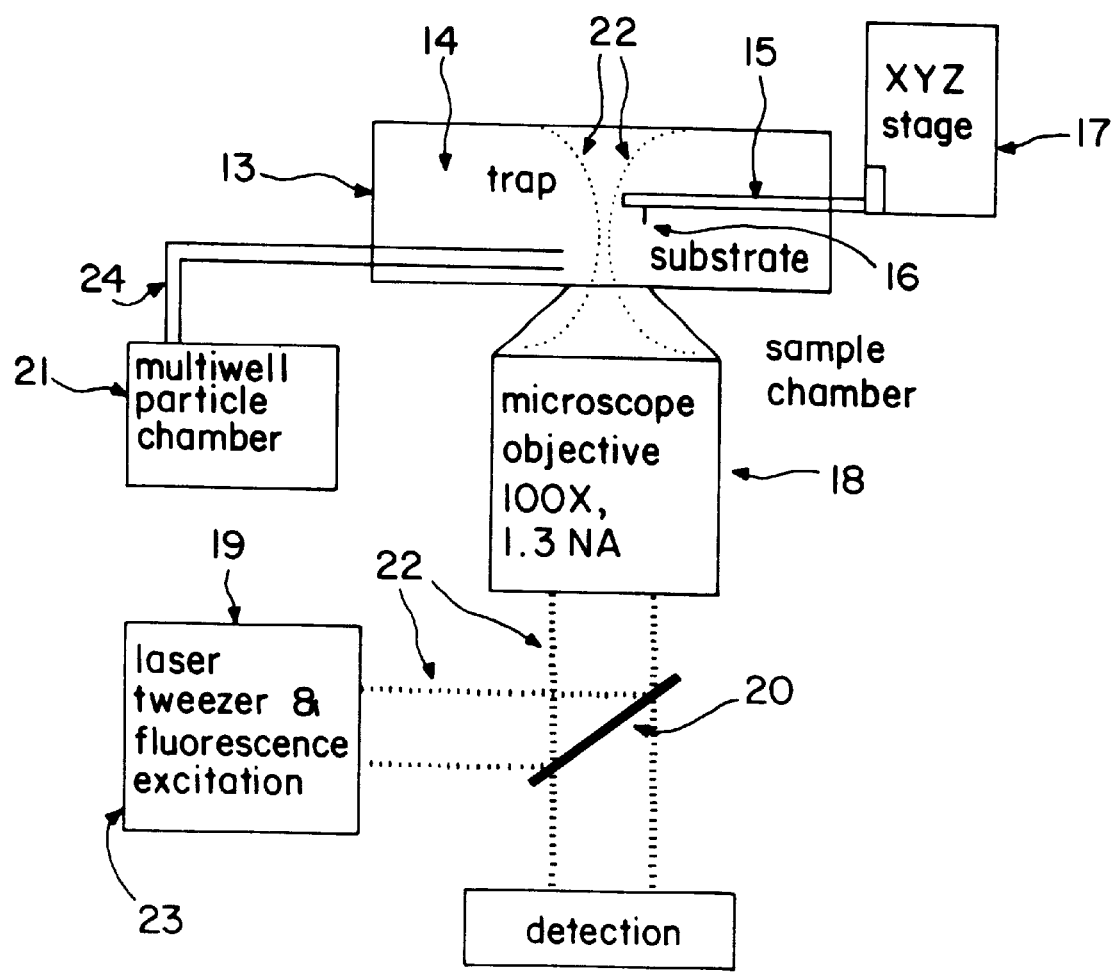
FIG. 5A is a schematical view of the second embodiment of the present invention (not to scale). A silicon cantilever is used as a semiconductor substrate.
Figure 5B:
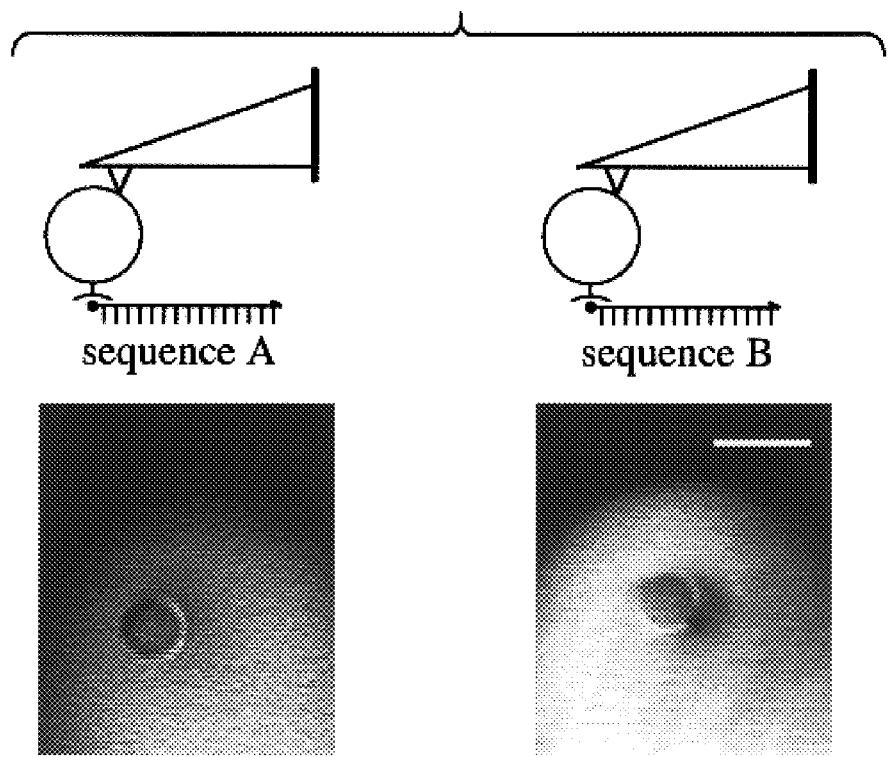
FIG. 5B is a schematical view (not to scale) of grafting a particle to a cantilever: an optical tweezer (70 mW incident tweezer laser power, 830 nm) is used to trap a 3 $\mu$m particle coated with numerous copies of a single stranded DNA molecule with a known DNA sequence. The particle is then moved onto the plane of the silicon cantilever.
Figure 5C:
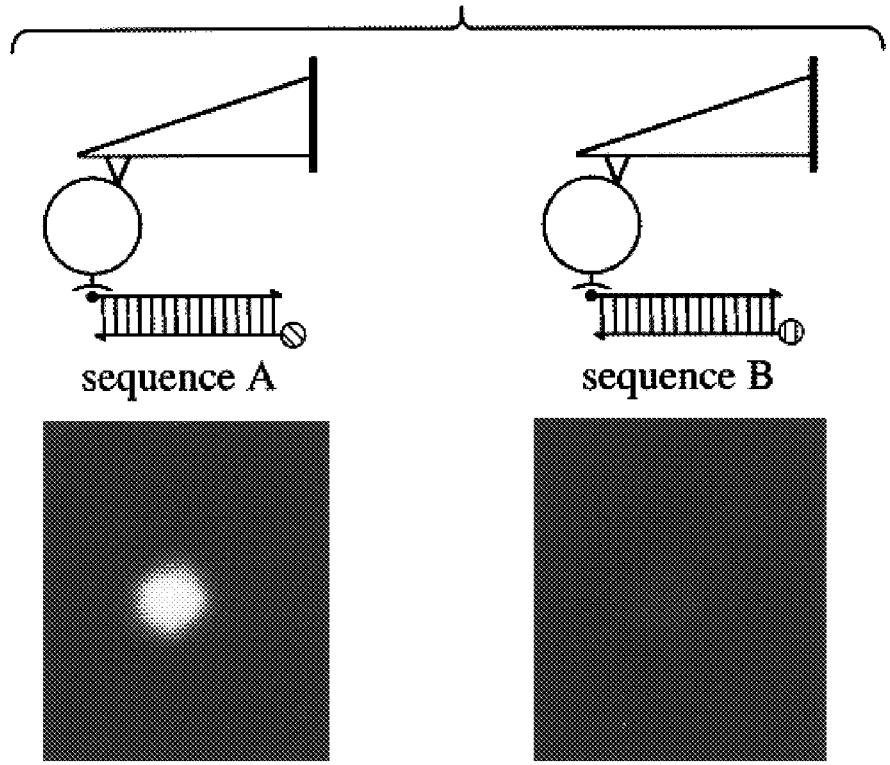
FIG. 5C depicts a trapped particle, visualized in brightfiled imaging, brought in contact with the cantilever edge. To graft, the tweezer is kept on for less than a second. Bar=5 $\mu$m.

Biochip Microfabrication: grafting of particles onto a semiconductor substrate DNA sequences or proteins serve as templates for information retrieval using specific recognition, i.e. hybridization for DNA and binding affinity for proteins. The possibility to assemble and recognize large number of DNA or protein molecules, in an addressable array on a solid substrate has wide ranging applications in biology (2). This is particularly important in high throughput screening for mutations, gene rearrangements, gene expression, viral integration or diversity in protein sequences. Recent progress has been made possible by applying chemical techniques to synthesize DNA sequences on a substrate(1, 12–16). Presented here is a novel method to microfabricate DNA/protein chips for a variety of applications. The present invention also allows the development of ultrasmall biochips and biosensors. Results and Discussion The present invention is based upon Applicants' discovery that by using an infrared optical tweezer (17), one can select a Brownian colloidal insoluble particle in a colloidal dispersion and use the same tweezer to selectively graft the particle into a silicon substrate (such as a silicon cantilever used in atomic force microscopy(18)). Particle grafting is done using the tweezer to heat the cantilever tip by infrared absorption. As it is heated, the polystyrene latex particle adheres to the cantilever by polymer wetting (FIG. 5). The particle wetting properties are not altered by the presence of a layer of adsorbed DNA or proteins. The method is general and does not depend on the substrate used as long as it absorbs infrared radiation. The utility of the present invention is demonstrated herein by grafting two particles with different single-stranded (ss) oligonucleotides to a substrate. The molecules on the particles are then exposed to fluorescently labeled complementary sequences for detection. Standard force microscope silicon cantilevers are used as semiconductor substrates (a silicon tip or a silicon nitride tip on one side and sub-micron thickness gold coating on the other side). A thin film deposited on the substrate, such as a thin gold coating, enhances the infrared absorption, both at the gold silicon interface and by increasing reflection. Typical incident laser diode power used for grafting is ~70 mW. The grafting time depends on the volume of silicon to be heated.

To graft a 3-$\mu$m polystyrene particle to the tip of the silicon cantilever takes about ~0.2 seconds (tip characteristic length 3 $\mu$m, curvature at the tip about 20 nanometers).

Figure 6A:
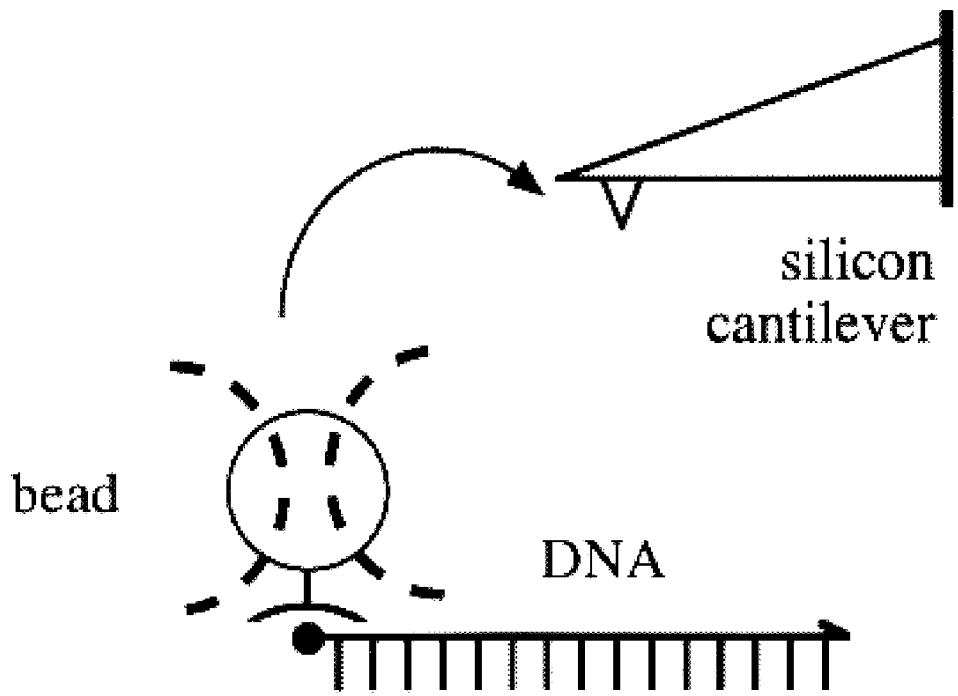
FIG. 6A is a schematical view and micrograph of a particle, covered with single stranded DNA oligonucleotides, grafted to the cantilever. The cantilever tips are shown with particles, using bright field imaging.
Figure 6B:
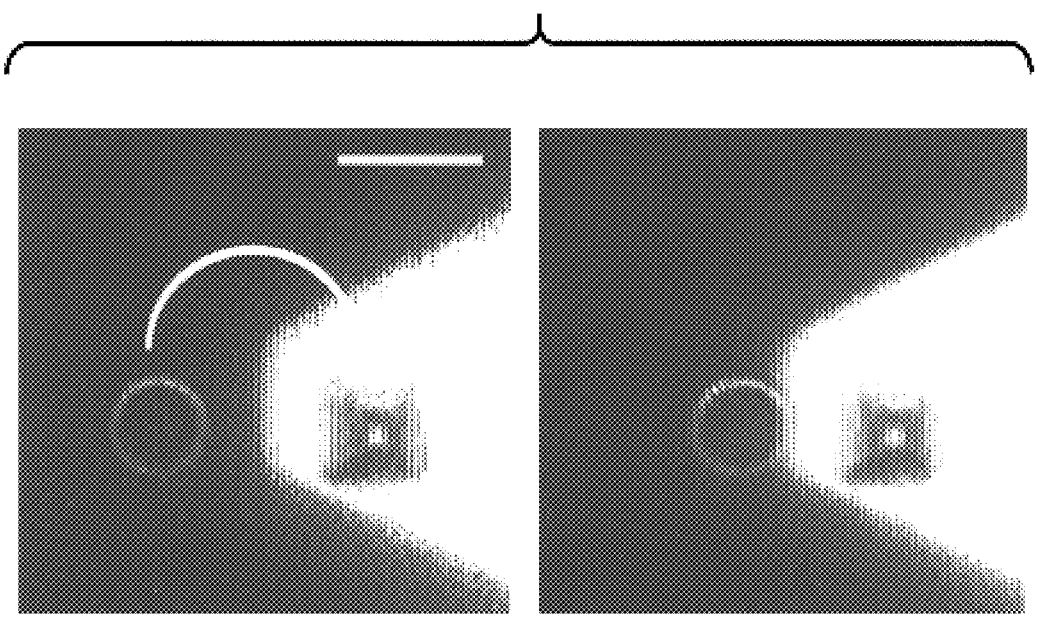
FIG. 6B is a schematical view of the hybridization of a oligonucleotide having a DNA sequence complementary to the DNA sequence of the oligonucleotide coating the particle, and a fluorescence detection of the grafted sequences by complementary DNA hybridization. The grey-scale images are acquired with an image intensifier and colored to represent two different fluorophores. The complementary sequence to the oligonucleotide having a DNA sequence of SEQ ID NO:1 is tagged with fluorophore FAM at the 3' end, and the nucleic acid molecule complementary to the oligonucleotide having a DNA sequence of SEQ ID NO:2 is tagged with rhodamine at the 3' end. Bar=5 μm.

To demonstrate the feasibility of the method particles, two different known DNA sequences were grafted onto a silicon cantilever. The DNA molecules coating the particles were then exposed to DNA molecules complementary thereto, and tagged with a fluorophore at the 3' end (FIG. 6).

The detailed procedure goes as follows: Biotin-modified ss DNA sequences are first biochemically attached to streptavidin-coated polystyrene particles. Using a small flow cell, a first colloidal dispersion with particles covered with a DNA molecule having a known sequence are transferred to a sample chamber. An optical tweezer is used to select one particle and then graft it to a pre-mounted cantilever in the chamber. In the next step, the chamber is washed with phosphate buffered saline (PBS) and a second colloidal dispersion with a set of particles coated with a second DNA molecule having a known sequence is transferred to the sample chamber for physical grafting. The grafted sequences are then detected by hybridization of ss, fluorescent DNA, using standard buffer conditions (see FIG. 6). During the physical grafting, there is minimal rupture of the functionality of the biotin-streptavidin links or the chemical bonds in DNA. This observation has been verified even at the level of a single double-stranded DNA polymer attachment (11). The time required to assemble an array of n particles, scales as n. It is estimated that with automated approaches, a typical time to graft $10^4$ particles in a regular array would be about 1 hour.

In summary the present invention readily permits grafting arrays of genomic DNA and proteins for real-time process monitoring based on DNA-DNA, DNA-protein or receptor-ligand interactions. By using an optical tweezer as a non-invasive tool, a particle coated with a molecule, such as a biomolecule, can be selected and grafted onto spatially localized positions of a semiconductor substrate. The non-invasive optical method, in addition to biochip fabrication, has applications in grafting arrays of specific biomolecules within microfluidic chambers that may enable separation methods for molecules as well as cells.
Experimental Protocol Grafting particles: The optical tweezer is constructed using a 150 mW, 830 nm near-infrared laser diode (SDL) and a 100 X, 1.3 N.A microscope objective (Zeiss). The wavelength of the infrared laser used corresponds to an energy of 1.48 eV. With silicon substrates (FIG. 6), about 10% of the incident power (~70 mW) is absorbed (Ia=Io $(1-e^{\alpha 1}) \leq 0.1$, here Ia is the absorbed power, Io is the incident power on a 5-$\mu$m$^2$ surface area of silicon cantilever, $\alpha$=780 cm$^{-1}$ is the absorption coefficient at 830 nm and t=0.8 $\mu$m, the thickness of the silicon cantilever) (19). In this case the increase in temperature of the flat silicon substrate in solution, for one second irradiation, is about 40° C. The sample-chamber is formed by a #1 coverglass with a polyvinyline o-ring glued to it by paraffin. The silicon substrate used is a standard silicon / silicon nitride cantilever (Park Scientific). It is mounted on a precision XYZ stage for alignment of the substrate with the laser tweezer axis. By using a small flow tube, particles covered with known sequence and suspended in 0.1 M PBS, are transferred to the sample chamber. A single particle is trapped using the laser tweezer and the aligned cantilever tip is moved to the trap. Typical grafting time is ~0.2 seconds. The sample chamber is rinsed in 0.1 M PBS and a second set of particles is introduced for grafting. The grafting and washing procedures are done manually.

Particle Preparation

3-μm amino modified polystyrene particles (Polysciences) are first covered with streptavidin by covalent attachment using glutaraldehyde linker. Biotin modified oligomers (New England Biolabs) are mixed with the particles (~$10^6$ oligomers/bead). Oligomers can then be attached using the biotin-streptavidin linker. Particles are suspended in PBS after centrifugation to remove free oligomers in solution and are directly used for grafting.

Detection

Complementary sequences are labeled with fluorescent markers for hybridization detection. The complement to a DNA molecule comprising a DNA sequence of GTATCAC-GAGGCCCT (SEQ ID NO:1) is labeled with FAM and a complement to a DNA molecule comprising a DNA sequence of GACAGCTTATCATCG (SEQ ID NO:2) is labeled with rhodamine, wherein both complements are labeled at their 3' end (New England Biolabs). After the particles are grafted, complementary strands of DNA (10 μg/ml in 0.1 M PBS) are transferred to the sample chamber for hybridization. The reaction is carried out at room temperature for more than 1 hour and the sample chamber is rinsed with PBS to remove any background fluorescence signal. The hybridization is detected with a standard fluorescence microscope arrangement with an intensifier and camera (Hamamatsu). The grafted beads are excited at 480 nm using a fluorescein filter to visualize FAM and then with 530 nm using a rhodamine filter to visualize rhodamine. Specific recognition of the two sequences on the grafted particles results in fluorescence. The data are recorded in grey scale on a video tape and artificially colored to show the contrast difference. Non-specific interaction results in much weaker contrast.

The present invention is not to be limited in scope by the specific embodiments describe herein. Indeed, various modifications of the invention in addition to those described herein will become apparent to those skilled in the art from the foregoing description and the accompanying figures. Such modifications are intended to fall within the scope of the appended claims.

Furthermore, it is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the appended claims.

Various publications are cited herein, the disclosures of which are incorporated by reference in their entireties.

REFERENCES

1. S.P.A. Fodor, J. L. Read, M. C. Pirrung, L. Stryer, A. T. Lu and D. Solas, Science, 251:767 (1991).
2. E. M. Southern, Trends in Genetics, 12:110 (1996).
3. K. L. Prime and G. M. Whitesides, Science, 252:1164 (1991).
4. C. S. Dudley, J. H. Georger, V. Krauthamer, D. A. Stenger, T. L. Fare and J. M. Calvert, Science, 252:551 (1991).
5. K. K. Berggren, a. Bard, J. L. Wilbur, J. D. Gillaspy, A. G. Heig, J. J. McClelland, S. L. Rolston, W. D. Phillips, M. Prentiss and G. M. Whitesides, Science, 269:1255 (1995).
6. R. J. Jackman, J. L,. Wilbur and G. M. Whitesides, Science, 269:664 (1995).
7. B. G. Healey, S. E. Foran and D. R. Walt, Science, 269:1078 (1995).
8. E. Delmarche, A. Bernard, H. Schmid, B. Michel and H. Biebuyck, Science, 276:779 (1997).
9. J. T. Groves, N. Ulman and S. G. Boxer, Science, 275:651 (1997).
10. D. T. Burke, M. A. Burns and C. Mastrangelo, Genome Research, 7:189 (1997)
11. G. V. Shivashankar and A. Libchaber, App. Phy. Lett., 71:3727 (1997).
12. A. B. Chetverin, F. R. Kramer, Bio/Technology, 12:1093–1099 (1994).
13. A. Goffeau, Nature, 385:202–203 (1997).
14 M. Schena, D. Shalon, R. Heller, A. Chai, P. O. Brown, and R. W. Davis, Proc.Nati.Acad.Sci. USA. 93:10614–10619 (1996).
15. J. A. Ferguson, T. C. Boles, C. P. Adams, and D. R. Walt, Nature Biotechnol., 14:1681–1684 (1996).
16. Z. Guo, R. A. Guilfoyle, A. J. Thiel, R. Wang, and Lloyd M. Smith, Nucl. Acid. Res. 22:5456–5465 (1994).
17. A. Ashkin, J. M. Dzidzic, J. E. Bjorkholm, and S. Chu. Opt.Lett. 11288–290 (1986).
18. G. Binnig, C. F. Quate, and C. Gerber., Phys. Rev. Lett. 56:930–933 (1986). absorbs electromagnetic radiation, is a poor conductor of heat, and has a low melting temperature, i.e. less than 1600 K.
19. G. Ben. Streetman, Solid State electronic Devices, Prentice Hall, 1986.

What is claimed is:

1. Apparatus for immobilizing a molecule onto a substrate, comprising:
   a) means for directing a beam of electromagnetic radiation at a substrate, wherein said substrate comprises a first surface and a second surface, and a film of a material deposited onto said second surface, wherein said film absorbs electromagnetic radiation and is a poor conductor of heat; and
   b) a chamber for holding a colloidal dispersion comprising insoluble particles coated with said molecule, such that said colloidal dispersion is in contact with said film;
   such that said beam can impinge said first surface, traverse said substrate, impinge an area of said film and ablate and melt said film at said area so that a gas bubble is formed in said colloidal dispersion above said area and disappears upon displacement of said beam, and said particles can adhere to said film at said area so that said molecule is immobilized onto said substrate.

2. The apparatus of claim 1, wherein said substrate comprises glass or silica.

3. The apparatus of claim 1, wherein said film has a thickness of approximately 50 Å.

4. The apparatus of claim 1, wherein said film comprises a material that absorbs electromagnetic radiation, is a poor conductor of heat, and has a low melting temperature.

5. The apparatus of claim 4, wherein said material comprises gold or aluminum.

6. The apparatus of claim 1, wherein said colloidal dispersion comprises an aqueous solution.

7. The apparatus of claim 6, wherein said aqueous solution comprises 50 mM of a phosphate buffered saline PBS), 50 mM NaCl, 0.2% polyoxyethylenesorbitan , 2 mM NaN$_3$, pH=7.4, or 0.1 M PBS.

8. The apparatus of claim 1, wherein said insoluble particles have a size smaller than said area.

9. The apparatus of claim 8, wherein insoluble particles have a size of approximately 2 nm to approximately 100 nm.

10. The apparatus of claim 1, wherein said particles comprise polystyrene, gold, or glass.

11. The apparatus of claim 1, wherein said particles comprise polystyrene beads having a size of about approximately 40 nm.

12. The apparatus of claim 1, wherein said colloidal dispersion comprises a concentration of particles of approximately $10^{11}$ particles/$\mu$l.

13. The apparatus of claim 1, wherein said beam has a wavelength in the near infrared region of the electromagnetic spectrum.

14. The apparatus of claim 13, wherein said beam of comprises a laser beam comprising a wavelength of 830 nm or 1064 nm.

15. The apparatus of claim 14, wherein said laser beam comprises a wavelength of 830 nm, an incident power of approximately 35 mW, a maximum power of approximately 150 mW, a circular cross sectional area with a diameter of approximately 1 $\mu$m, and impinges said area for approximately 0.2 seconds.

16. The apparatus of claim 1, wherein said directing means comprises a microscopic objective lens immersed in oil, wherein said lens has a magnification of 100X, a 1.3 N.A., and a focal point on said film.

17. The apparatus of claim 1, further comprising a means for steering said beam to permit movement of impingement of said beam with said film.

18. The apparatus of claim 17, wherein said steering means comprises two telescopic lenses with a focal length of 100 mm positioned such that said beam propagates through said telescopic lenses prior to propagating through said directing means.

19. The apparatus of claim 17, wherein movement of impingement of said beam with said film comprises a velocity of approximately 5 $\mu$m/second to approximately 50 $\mu$m/second.

20. The apparatus of claim 1, further comprising a means of generating said beam.

21. The apparatus of claim 20, wherein said generating means comprises a near infrared diode laser.

22. The apparatus of claim 1, wherein said molecule is a biomolecule.

23. The apparatus of claim 22, wherein said biomolecule comprises an isolated nucleic acid molecule or fragments thereof, an isolated protein or fragments thereof, a lipid, or a carbohydrate.

24. The apparatus of claim 23, wherein said isolated nucleic acid molecule comprises DNA, RNA, or a combination thereof.

25. The apparatus of claim 23, wherein said isolated protein comprises an antibody, a receptor, a DNA binding protein, a protein having a protein binding domain, a cytokine, a lymphokine, or a hormone.

26. Apparatus for immobilizing a molecule onto a substrate, comprising:
   a) a chamber for holding a colloidal dispersion of insoluble particles coated with said molecule;
   b) means for supporting said substrate in said chamber; and
   b) means for selecting a particle of said colloidal dispersion and grafting said particle onto said substrate, such that said molecule is immobilized onto said substrate.

27. The apparatus of claim 26, wherein said substrate comprises a cantilever, and said particle is grafted to said cantilever.

28. The apparatus of claim 26, wherein said substrate comprises silicon or silicon nitride.

29. The apparatus of claim 27, wherein said substrate is coated with a film that absorbs electromagnetic radiation, is a poor conductor of heat, and has a low melting temperature.

30. The apparatus of claim 29, wherein said film comprises gold or aluminum.

31. The apparatus of claim 29, wherein said film has a thickness of approximately 50 Å.

32. The apparatus of claim 27, wherein said colloidal dispersion comprises an aqueous solution.

33. The apparatus of claim 32, wherein said aqueous solution comprises 50 mM of a phosphate buffered saline (PBS), 50 mM NaCl, 0.02% polyoxyethylenesorbitan, 2 mM $NaN_3$, pH=7.4 or 0.1 M PBS.

34. The apparatus of claim 27, wherein said particles comprise polystyrene, gold, or glass.

35. The apparatus of claim 33, wherein said particles comprise polystyrene beads having a size of about approximately 3 $\mu$m.

36. The apparatus of claim 27, wherein said selecting and grafting means comprises an optical tweezer.

37. The apparatus of claim 36, wherein said optical tweezer comprises a laser beam having a wavelength in the near infrared region of the electromagnetic spectrum, and a microscopic objective lens, such that said beam passes through said lens, and enters said chamber.

38. The apparatus of claim 37, wherein said microscopic objective lens has properties of 100 X, and 1.3 numerical aperture.

39. The apparatus of claim 37, wherein said laser beam comprises a wavelength of 830 nm.

40. The apparatus of claim 27, wherein said chamber is formed by a #1 cover glass with a polyvinyline o-ring glued onto said cover glass with paraffin.

41. The apparatus of claim 27, wherein said supporting means comprises an XYZ stage located adjacent to said chamber, wherein said stage permits movement of said substrate towards said selected particle.

* * * * *